United States Patent
Watkins et al.

[11] Patent Number: 6,125,898
[45] Date of Patent: Oct. 3, 2000

[54] MOTOR-CYCLE RADIAL TIRE

[75] Inventors: David Robert Watkins, Sutton Coldfield; Michael Jackson, Birmingham, both of United Kingdom

[73] Assignee: Sumitomo Rubber Industries Limited, Kobe, Japan

[21] Appl. No.: 09/124,242

[22] Filed: Jul. 29, 1998

[30]      Foreign Application Priority Data

Aug. 2, 1997 [GB]   United Kingdom .................. 9716276

[51] Int. Cl.⁷ ................. B60C 1/00; B60C 3/00; B60C 9/18; B60C 11/00
[52] U.S. Cl. .................. 152/209.5; 152/209.11; 152/454; 152/532; 152/534; 152/537
[58] Field of Search ............... 152/209.1, 209.5, 152/209.11, 454, 532, 535, 536, 537, 526, 534

[56]            References Cited

U.S. PATENT DOCUMENTS

| | | | |
|---|---|---|---|
| 4,062,393 | 12/1977 | Bertrand ................................... | 152/532 |
| 4,671,333 | 6/1987 | Rohde et al. ............................ | 152/532 |
| 4,735,247 | 4/1988 | Makino et al. ....................... | 152/209.5 |
| 4,838,330 | 6/1989 | Takayama ............................. | 152/209.5 |
| 4,966,215 | 10/1990 | Oka .......................................... | 152/526 |
| 4,986,326 | 1/1991 | Watkins et al. ......................... | 152/532 |
| 5,427,164 | 6/1995 | Williams et al. ....................... | 152/532 |
| 5,441,093 | 8/1995 | Shirasyouji et al. .................... | 152/454 |
| 5,529,102 | 6/1996 | Watkins et al. ......................... | 152/526 |
| 5,593,523 | 1/1997 | Suzuki et al. ........................... | 152/526 |
| 5,783,004 | 7/1998 | Suzuki .................................... | 152/526 |
| 5,829,503 | 11/1998 | Watkins et al. ......................... | 152/526 |

FOREIGN PATENT DOCUMENTS

| | | | |
|---|---|---|---|
| 2620979 | 3/1989 | France .................................... | 152/454 |
| 60-219103 | 11/1985 | Japan ..................................... | 152/532 |
| 63-305007 | 12/1988 | Japan ..................................... | 152/526 |
| 3-169713 | 7/1991 | Japan ..................................... | 152/526 |
| 4-197805 | 7/1992 | Japan ................................. | 152/209.11 |

*Primary Examiner*—Steven D. Maki

[57]              ABSTRACT

A radial motorcycle tire having improved lateral grip under camber with good stability, wherein the tread is reinforced by two main breaker plies comprising parallel reinforcing cords oppositely inclined with respect to the tire circumferential direction and a supplementary breaker ply is disposed radially outward of the main breaker plies and comprises a cord reinforced central ply portion and lateral outer side ply portions disposed on opposite sides of the central ply portion, said lateral side portions comprising rubber having no cord reinforcement.

13 Claims, 1 Drawing Sheet

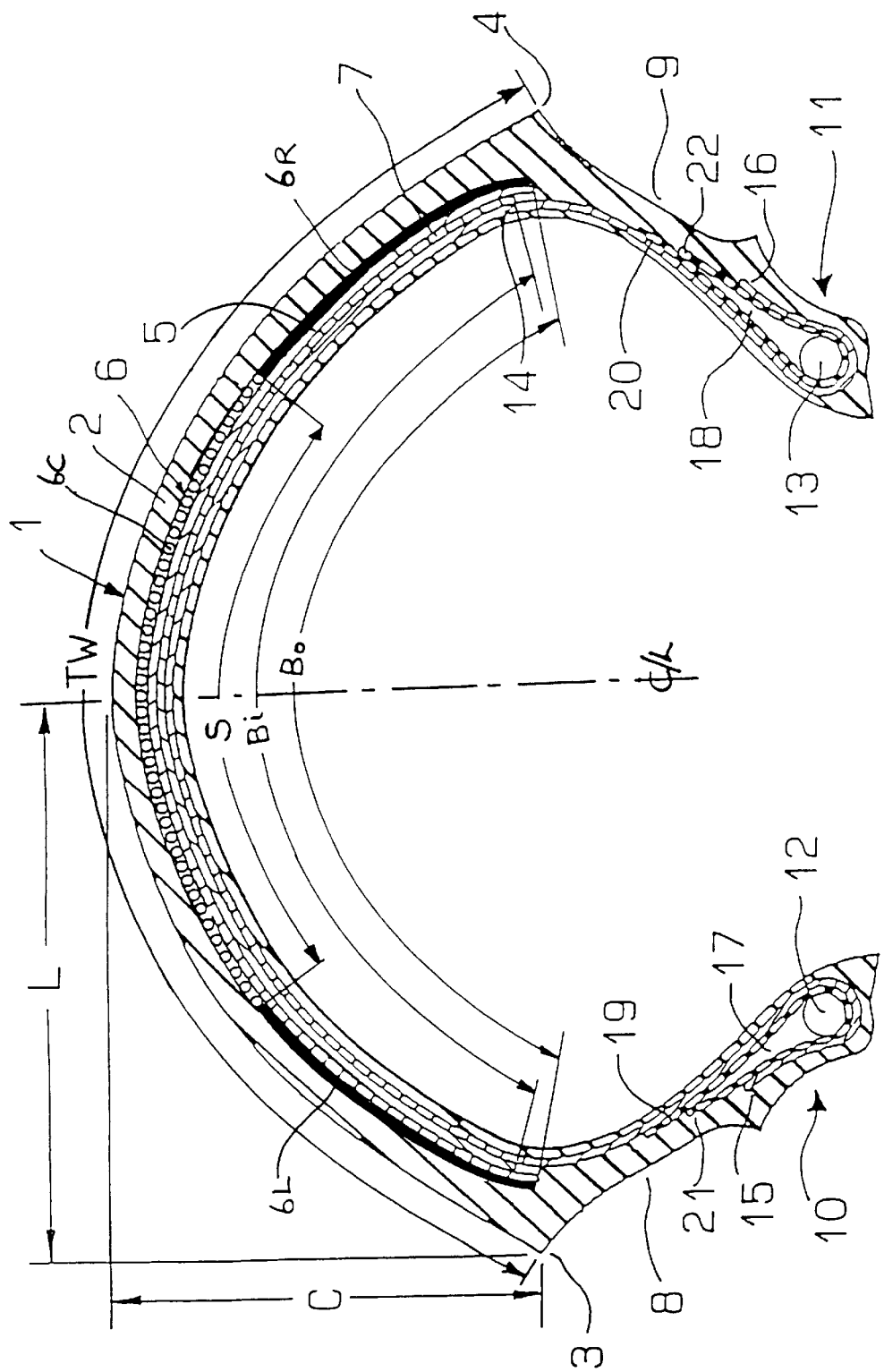

MOTOR-CYCLE RADIAL TIRE

BACKGROUND OF THE INVENTION

The present invention relates to radial motorcycle tires and in particular but not exclusively to high performance or race motor-cycle tires.

Radial motorcycle tires utilize very wide treads which in transverse cross-section are sharply curved to provide good contact with the road surface when the motorcycle is steeply banked when cornering. Maintenance of a consistent ground contact area or 'tire footprint' under all conditions is a major problem in determining general vehicle handling. Of particular importance in race motorcycle tires of radial construction is the provision of high cornering power with good stability to maximize cornering speeds under racing conditions.

Present radial motor-cycle race tires have short sidewalls which extend to the tread edges radially and axially outwardly from the tire beads. The beads provide engagement to the wheelrim on tapered bead seats. The sidewalls are reinforced by radial carcass plies which when tensioned by the inflation pressure act together with sidewall geometry to provide location of the curved tread regions to withstand cornering forces.

The sharply curved tread region of the tire is specially reinforced by a reinforcing breaker to give the required structural rigidity to allow for banking over of the motor-cycle when cornering while providing sufficient flexibility to allow localized tread flattening in the ground contact patch for achieving good road grip.

Such tires however, due to their uniform breaker structures, do not provide fully optimum stability and lateral grip, particularly under camber. Such tires also suffer from excessive tread wear under acceleration at high camber angles particularly when the tire is oversteering. It therefore an object of the present invention is to improve the properties of such tires.

SUMMARY OF THE INVENTION

According to one aspect of the present invention a radial motorcycle tire comprises a tread reinforced between its edges by a breaker assembly and having in its normally inflated fitted condition a camber value C/L of between 0.5 and 0.7, a reinforcing carcass ply of radially disposed cords positioned radially inside the breaker assembly and extending between two bead regions and wrapped in each bead region around an annular bead core from the axial inside to the outside to form carcass ply turn-ups and between the tread edges and bead regions, tire sidewalls, wherein the breaker assembly comprises two main breaker plies comprising parallel reinforcing cords oppositely inclined with respect to the circumferential direction of the tire, and a supplementary breaker ply disposed immediately radially outwardly of the two main breaker plies and comprising in the center, a central ply portion comprising cord reinforced rubber fabric and abutting the central portion on either axial edge two outer ply portions comprising rubber having no cord reinforcement.

By camber value is meant the ratio C/L between the radial distance C from the center to the edge of the tire tread and the axial distance L between the center and edge of the tread.

Preferably the two lateral outer ply portions of the supplementary breaker ply have a thickness in the range 0.75 to 1.0 mm and comprise a blend of 80% natural and 20% emulsion styrene-butadiene rubbers, and preferably have a hardness in the range 70 to 80 Shore A, and modulus at 300% extension in the range of 10 to 15 MPa.

Also preferably the central ply portion has a width of between 35% and 65% of the width of the widest of the two main breaker plies.

BRIEF DESCRIPTION OF THE DRAWINGS

Further aspects of the present invention will become apparent from the description of the following embodiments in conjunction with the attached diagrammatic drawing in which:

FIG. 1 shows in cross-section a 170/60 R17 radial motor-cycle tire intended for high speed racing.

DETAILED DESCRIPTION OF THE INVENTION

The tire 1 of FIG. 1 comprises a pair of sidewalls 8 and 9 terminating in bead regions 10 and 11. Each bead region is reinforced by an inextensible annular bead core 12 and 13. Extending between each bead region is a tire carcass reinforcement ply 14 which is anchored in each bead region by being turned around the respective bead core 12,13 laterally from the inside to the outside to form a ply turn-up 15,16. The carcass reinforcement ply 14 comprises a single ply of nylon tire fabric laid with the cords substantially radially. Each bead 10,11 further comprises a hard rubber apex member 17,18 which is anchored to each respective bead core 12,13 and extends taperingly radially outwardly.

The tire 1 has a camber value of 0.6 and comprises a convex tread region 2, having tread edges 3,4, reinforced by a breaker assembly. The width TW of the tread is 220 mm measured along the outer surface. The breaker assembly comprises two main breaker plies 5 and 7 each of which comprises Kevlar (Registered Trade Mark) aramid cord tire fabric each of 2/165 TEX. The cords in each of the breaker plies 5 and 7 are oppositely inclined to each other at an angle of between 16° and 36°, preferably 25°, to the circumferential direction of the tire in the central crown region of the tire. The radially inner breaker ply 7 has a width Bi of 200 mm and is narrower than the radially outer breaker ply 5 which has a width Bo of 220 mm.

Radially outside and immediately adjacent to the main breaker plies a supplementary breaker ply 6 having width equal to that of the adjacent main breaker ply 5 and comprising in the central region a central ply portion 6c which is flanked in the left and right edge regions by outer ply portions 6L and 6R respectively and which abut the edges of the central ply portion 6c.

The central ply portion 6c comprises rubber tire fabric reinforced by parallel cords of polyamide extending at 30° or less to the circumferential direction of the tire and crossed with respect to the cords of the radially inwardly adjacent main breaker 5. The width 5 of the central ply portion 6c is 110 mm, i.e. 50% of the width Bo of the widest of the main breaker plies 5.

The two outer ply portions which are of equal width comprise rubber compound without cord reinforcement. The rubber compound is a blend of 80% by weight of Natural rubber and 20% by weight of an Emulsion SBR. These outer ply portions have a hardness in the range of 70 to 80 Shore A and specifically 72 Shore A and a modulus at 300% extension in the range of 10 to 15 MPa, specifically 12.8 MPa.

The thickness of the two outer ply portions 6L and 6R is substantially the same as that of the central ply portions 6c and is in the range of 0.75 to 1.0 mm.

The resultant tires have been found to have improved cornering power and stability under all conditions and improved grip particularly lateral grip when the tire is running under camber. This construction has also been shown to give superior tread wear resistance under acceleration at high camber angles when the tire is oversteering.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radial motorcycle tire comprising a tread reinforced between its edges by a breaker assembly and having in its normally inflated, fitted condition a camber value C/L of between 0.5 and 0.7, a reinforcing carcass ply of radially disposed cords extending radially inside the breaker assembly and between two bead regions and wrapped in each bead region around an annular bead core from the axial inside to the outside to form carcass ply turn-ups, and tire sidewalls disposed between the tread edges and bead regions, wherein the breaker assembly comprises two main breaker plies of parallel reinforcing cords oppositely inclined with respect to the circumferential direction of the tire and a supplementary breaker ply disposed immediately radially outward of the two main breaker plies, and having three ply portions comprising a central ply portion containing cord-reinforced rubber fabric and abutting lateral, outer ply side portions extending from the axial edge of said central ply portion, said lateral outer ply side portions comprising rubber having no cord reinforcement, the lateral outer ply side portions having the same rubber compound, and the supplementary breaker ply extending the full width of the breaker assembly and each of the portions of the supplementary breaker ply having a thickness in the range of 0.75–1.0 mm.

2. The radial motorcycle tire according to claim 1, wherein the lateral outer ply side portions of the supplementary breaker ply have a rubber hardness in the range of 70 to 80 Shore A.

3. The radial motorcycle tire according to claim 1, wherein the lateral outer ply side portions of the supplementary breaker ply have a rubber hardness of 72 Shore A.

4. The radial motorcycle tire according to claim 1, wherein the lateral outer ply side portions of the supplementary breaker ply have a rubber modulus at 300% extension of between 10 and 15 MPa.

5. The radial motorcycle tire according to claim 1, wherein the lateral outer ply side portions of the supplementary breaker ply have a rubber modulus at 300% extension of 12.8 MPa.

6. The radial motorcycle tire according to claim 1, wherein the lateral outer ply side portions of the supplementary breaker ply comprise a blend of 80% by weight of natural rubber and 20% by weight of emulsion SBR rubber.

7. The radial motorcycle tire according to claim 1, wherein reinforcing cords of the central ply portion of the supplementary breaker ply are inclined at an angle of 30° or less to the tire circumferential direction.

8. The radial motorcycle tire according to claim 1, wherein reinforcing cords of the central ply portion of the supplementary breaker ply comprise polyamide cords.

9. The radial motorcycle tire according to claim 1, wherein the central ply portion of the supplementary breaker ply has a width in the range 35% to 65% of the width the wider of the two main breaker plies.

10. The radial motorcycle tire according to claim 1, wherein the supplementary breaker ply has a width equal to the width of the widest of the two main breaker plies.

11. The radial motorcycle tire according to claim 1, wherein the radially outermost main breaker ply is wider than the inner main breaker ply.

12. The radial motorcycle tire according to claim 1, wherein the reinforcing cords of the two main breaker plies are inclined at an angle of between 16° and 36° in the central crown region.

13. The radial motorcycle tire according to claim 1, wherein the reinforcing cords of the two main breaker plies comprise aramid cords.

* * * * *